United States Patent
Wei et al.

(10) Patent No.: US 10,015,504 B2
(45) Date of Patent: Jul. 3, 2018

(54) COMPRESSING IMAGE SEGMENTATION DATA USING VIDEO CODING

(71) Applicant: QUALCOMM Incorporated, San Diego, CA (US)

(72) Inventors: Jian Wei, San Diego, CA (US); Ying Chen, San Diego, CA (US); Lei Wang, Clovis, CA (US)

(73) Assignee: QUALCOMM Incorporated, San Diego, CA (US)

(*) Notice: Subject to any disclaimer, the term of this patent is extended or adjusted under 35 U.S.C. 154(b) by 104 days.

(21) Appl. No.: 15/220,856

(22) Filed: Jul. 27, 2016

(65) Prior Publication Data
US 2018/0035120 A1 Feb. 1, 2018

(51) Int. Cl.
*H04N 19/44* (2014.01)
*H04N 19/12* (2014.01)
*G06T 1/20* (2006.01)

(52) U.S. Cl.
CPC .............. *H04N 19/44* (2014.11); *G06T 1/20* (2013.01); *H04N 19/12* (2014.11)

(58) Field of Classification Search
CPC ........ H04N 19/40; H04N 19/44; H04N 19/45; H04N 19/12; H04N 19/103; H04N 11/16; H04N 11/167; H04N 11/186; G06T 1/20; G06T 9/00–9/008; G06T 7/11; G06T 7/194; H03M 7/425; H03M 7/6005
See application file for complete search history.

(56) References Cited

U.S. PATENT DOCUMENTS

| | | | | |
|---|---|---|---|---|
| 5,930,387 A | * | 7/1999 | Chan | H04N 1/648 358/523 |
| 7,113,645 B2 | * | 9/2006 | Sano | G06T 3/4084 382/233 |
| 7,664,329 B2 | | 2/2010 | Boregowda et al. | |
| 7,760,936 B1 | * | 7/2010 | King | H04N 19/176 382/166 |
| 7,885,463 B2 | | 2/2011 | Zhang et al. | |
| 8,290,253 B1 | * | 10/2012 | Wang | G06K 9/4652 382/162 |
| 8,335,379 B2 | * | 12/2012 | Malik | G06T 7/11 382/173 |

(Continued)

FOREIGN PATENT DOCUMENTS

WO 2008010929 A2 1/2008

OTHER PUBLICATIONS

International Search Report and Written Opinion—PCT/US2017/036596—ISA/EPO—dated Sep. 15, 2017 (14 pages).

(Continued)

*Primary Examiner* — Michael Osinski
(74) *Attorney, Agent, or Firm* — Shumaker & Sieffert, P.A.

(57) ABSTRACT

In an example of this disclosure, a method may include receiving or generating image segmentation data for a plurality of pixels. The image segmentation data may include one or more image segmentation values for each pixel of the plurality of pixels. The method may include converting the one or more image segmentation values into one or more image component values. The method may include sending the one or more image component values corresponding to the one or more image segmentation values to a video encoder.

24 Claims, 5 Drawing Sheets

(56) References Cited

U.S. PATENT DOCUMENTS

| | | | | |
|---|---|---|---|---|
| 8,345,998 | B2* | 1/2013 | Malik | H03M 7/3064 |
| | | | | 382/173 |
| 8,643,910 | B2* | 2/2014 | Ichikawa | G03G 15/0189 |
| | | | | 358/1.9 |
| 2004/0264793 | A1* | 12/2004 | Okubo | H04N 1/41 |
| | | | | 382/243 |
| 2005/0244065 | A1* | 11/2005 | Malvar | G06K 9/36 |
| | | | | 382/239 |
| 2006/0062478 | A1 | 3/2006 | Cetin et al. | |
| 2007/0206865 | A1* | 9/2007 | Boregowda | G06K 9/00771 |
| | | | | 382/225 |
| 2007/0237393 | A1* | 10/2007 | Zhang | G06K 9/38 |
| | | | | 382/173 |
| 2008/0304762 | A1* | 12/2008 | Matsumoto | G06K 9/38 |
| | | | | 382/243 |
| 2009/0067733 | A1* | 3/2009 | Ballerini | H04N 1/644 |
| | | | | 382/237 |
| 2010/0253702 | A1* | 10/2010 | Gotoh | H04N 1/0044 |
| | | | | 345/660 |
| 2010/0303360 | A1* | 12/2010 | Matsuda | H04N 1/3871 |
| | | | | 382/195 |
| 2010/0322300 | A1 | 12/2010 | Li et al. | |
| 2011/0026814 | A1* | 2/2011 | Nuuja | H04N 1/41 |
| | | | | 382/164 |
| 2011/0058609 | A1* | 3/2011 | Chaudhury | H04N 19/23 |
| | | | | 375/240.16 |
| 2011/0158529 | A1* | 6/2011 | Malik | H04N 19/20 |
| | | | | 382/173 |
| 2011/0176728 | A1* | 7/2011 | Matsuoka | H04N 1/41 |
| | | | | 382/166 |
| 2011/0255777 | A1* | 10/2011 | Matsuoka | H04N 1/40062 |
| | | | | 382/164 |
| 2012/0039534 | A1* | 2/2012 | Malik | H03M 7/3064 |
| | | | | 382/173 |
| 2012/0134581 | A1* | 5/2012 | Matsuda | H04N 1/41 |
| | | | | 382/164 |
| 2012/0163712 | A1* | 6/2012 | Nakajima | H04N 9/74 |
| | | | | 382/165 |
| 2012/0170659 | A1* | 7/2012 | Chaudhury | H04N 19/139 |
| | | | | 375/240.16 |
| 2012/0219216 | A1* | 8/2012 | Sato | G06T 9/00 |
| | | | | 382/166 |
| 2013/0064465 | A1* | 3/2013 | Tin | G06T 5/50 |
| | | | | 382/248 |
| 2013/0222817 | A1* | 8/2013 | Suzuki | G03G 15/6585 |
| | | | | 358/1.1 |
| 2014/0010446 | A1* | 1/2014 | Chujoh | G06T 9/004 |
| | | | | 382/166 |
| 2014/0050414 | A1* | 2/2014 | Strom | G06T 9/00 |
| | | | | 382/238 |
| 2014/0086309 | A1* | 3/2014 | Beer-Gingold | H03M 7/3064 |
| | | | | 375/240.02 |
| 2014/0105284 | A1* | 4/2014 | Lim | H04N 19/176 |
| | | | | 375/240.03 |
| 2014/0211858 | A1* | 7/2014 | Zhao | H04N 19/00903 |
| | | | | 375/240.26 |
| 2014/0241625 | A1* | 8/2014 | Suzuki | G06T 7/0081 |
| | | | | 382/164 |
| 2015/0117778 | A1* | 4/2015 | Doi | G06T 9/20 |
| | | | | 382/173 |
| 2015/0195553 | A1* | 7/2015 | Tamatani | H04N 19/44 |
| | | | | 382/233 |
| 2015/0229934 | A1* | 8/2015 | Li | H04N 19/29 |
| | | | | 375/240.16 |
| 2016/0125621 | A1* | 5/2016 | Saitwal | G06T 7/408 |
| | | | | 382/165 |
| 2016/0189389 | A1* | 6/2016 | Sawada | H04N 1/6027 |
| | | | | 382/164 |
| 2016/0301942 | A1* | 10/2016 | Qiu | H04N 19/436 |
| 2017/0111661 | A1* | 4/2017 | Boyce | H04N 19/44 |
| 2017/0147882 | A1* | 5/2017 | Lin | G06K 9/00718 |

OTHER PUBLICATIONS

Jiang H., et al., "A Hardware Architecture for Real-Time Video Segmentation Utilizing Memory Reduction Techniques", IEEE Transactions on Circuits and Systems for Video Technology, Feb. 1, 2009, vol. 19, No. 2, XP011280557, ISSN: 1051-8215, DOI: 10.1109/TCSVT.2008.2009244, pp. 226-236.

Ratnayake K., et al., "Embedded Architecture for Noise-Adaptive Video Object Detection using Parameter-Compressed Background Modeling", Journal of Real-Time Image Processing, Springer, Apr. 11, 2014, vol. 13, No. 2, XP036282144, ISSN: 1861-8200, DOI: 10.1007/S11554-014-0418-X, pp. 397-414.

Sabbagh M., et al., "Taming the Memory Demand Complexity of Adaptive Vision Algorithms", International Embedded Systems Symposium, Nov. 3, 2015, XP055402589, Retrieved from the Internet: URL:http://www.northeastern.edu/esl/sites/default/files/Sabbagh_IESS_2016.pdf [retrieved on Aug. 30, 2017], 12 pages.

Tabkhi H., et al., "Power-Efficient Real-time Solution for Adaptive Vision Algorithms", IET Computers and Digital Techniques, The Institution of Engineering and Technology, Jan. 1, 2015, vol. 9, No. 1, XP006050559, ISSN: 1751-8601, DOI: 10.1049/IET-CDT.2014. 0075, pp. 16-26.

Written Opinion from corresponding PCT Application Serial No. PCT/US2017/036596 filed on May 24, 2018, (18 pp).

* cited by examiner

COMPRESSING IMAGE SEGMENTATION DATA USING VIDEO CODING

TECHNICAL FIELD

This disclosure relates to image and/or video processing.

BACKGROUND

Computing devices may generate image segmentation data, which is used as part of an image segmentation process to determine what part(s) of an image constitute(s) the foreground and what part(s) of the image constitute(s) the background. Such computing devices may include, for example, computer workstations, mobile phones such as so-called smartphones, embedded systems, personal computers, tablet computers, video game consoles, cameras (e.g., video cameras such as security cameras). A processing unit of the computing device typically stores image segmentation data on a memory (e.g., an on- or off-chip memory). The size of image segmentation data may grow as the number of pixels increases in the image for which the image segmentation data is generated.

SUMMARY

In general, this disclosure describes techniques for image and/or video processing, and more specifically, the encoding and decoding (e.g., compressing and decompressing) of image segmentation data. For example, this disclosure describes techniques for encoding and decoding (e.g., compressing and decompressing) image segmentation data and/or data representative of image segmentation data. As one example, this disclosure describes techniques for converting image segmentation data (e.g., Gaussian Mixture Model data) into image data. The image data may be representative of the image segmentation data and may be encoded (e.g., compressed) according to one or more video coding techniques.

In one example, this disclosure describes a method comprising receiving or generating, by a processing unit, image segmentation data for an image, wherein the image includes a plurality of pixels with each pixel being represented by one or more image component values, wherein the image segmentation data includes one or more image segmentation values for each pixel of the plurality of pixels; converting, by the processing unit, the one or more image segmentation values into one or more image component values; and sending, by the processing unit, the one or more image component values corresponding to the one or more image segmentation values to a video encoder.

In another example, this disclosure describes a method comprising receiving, by a video decoder, one or more encoded image component values; decoding, by the video decoder, the one or more encoded image component values according to a video coding standard or a video coding specification to generate one or more decoded image component values; outputting, by the video decoder, the one or more decoded image component values to a processing unit; and converting, by the processing unit, the one or more decoded image component values into one or more image segmentation values, wherein the video decoder is a component of the processing unit or the video decoder is not a component of the processing unit.

In another example, this disclosure describes a device comprising a first memory; and a processing unit configured to: receive or generate image segmentation data for an image, wherein the image includes a plurality of pixels with each pixel being represented by one or more image component values, wherein the image segmentation data includes one or more image segmentation values for each pixel of the plurality of pixels; convert the one or more image segmentation values into one or more image component values; store the one or more image component values corresponding to the one or more image segmentation values in the first memory; and send the one or more image component values corresponding to the one or more image segmentation values to a video encoder.

In another example, this disclosure describes a device comprising a memory; a processing unit; and a video decoder configured to receive one or more encoded image component values from the memory, decode the one or more encoded image component values according to a video coding standard or a video coding specification to generate one or more decoded image component values, and output the one or more decoded image component values to the processing unit, and wherein the processing unit configured to convert the one or more decoded image component values into one or more image segmentation values, and wherein the video decoder is a component of the processing unit or the video decoder is not a component of the processing unit.

In another example, this disclosure describes an apparatus comprising means for receiving or generating image segmentation data for an image, wherein the image includes a plurality of pixels with each pixel being represented by one or more image component values, wherein the image segmentation data includes one or more image segmentation values for each pixel of the plurality of pixels; means for converting the one or more image segmentation values into one or more image component values; and means for sending the one or more image component values corresponding to the one or more image segmentation values to a video encoder.

In another example, this disclosure describes an apparatus comprising means for receiving one or more encoded image component values; means for decoding the one or more encoded image component values according to a video coding standard or a video coding specification to generate one or more decoded image component values; means for outputting the one or more decoded image component values to means for converting the one or more decoded image component values into one or more image segmentation values.

In another example, this disclosure describes a non-transitory computer-readable storage medium having instructions stored thereon that, when executed, cause one or more processors of a computing device to: receive or generate image segmentation data for an image, wherein the image includes a plurality of pixels with each pixel being represented by one or more image component values, wherein the image segmentation data includes one or more image segmentation values for each pixel of the plurality of pixels; convert the one or more image segmentation values into one or more image component values; and send the one or more image component values corresponding to the one or more image segmentation values to a video encoder.

In another example, this disclosure describes a non-transitory computer-readable storage medium having instructions stored thereon that, when executed, cause one or more processors of a computing device to: receiving one or more encoded image component values; decode the one or more encoded image component values according to a video coding standard or a video coding specification to generate one or more decoded image component values; and convert the one or more decoded image component values into one or more image segmentation values.

The details of one or more examples of the disclosure are set forth in the accompanying drawings and the description below. Other features, objects, and advantages of the disclosure will be apparent from the description and drawings, and from the claims.

DETAILED DESCRIPTION

Figure 1A:
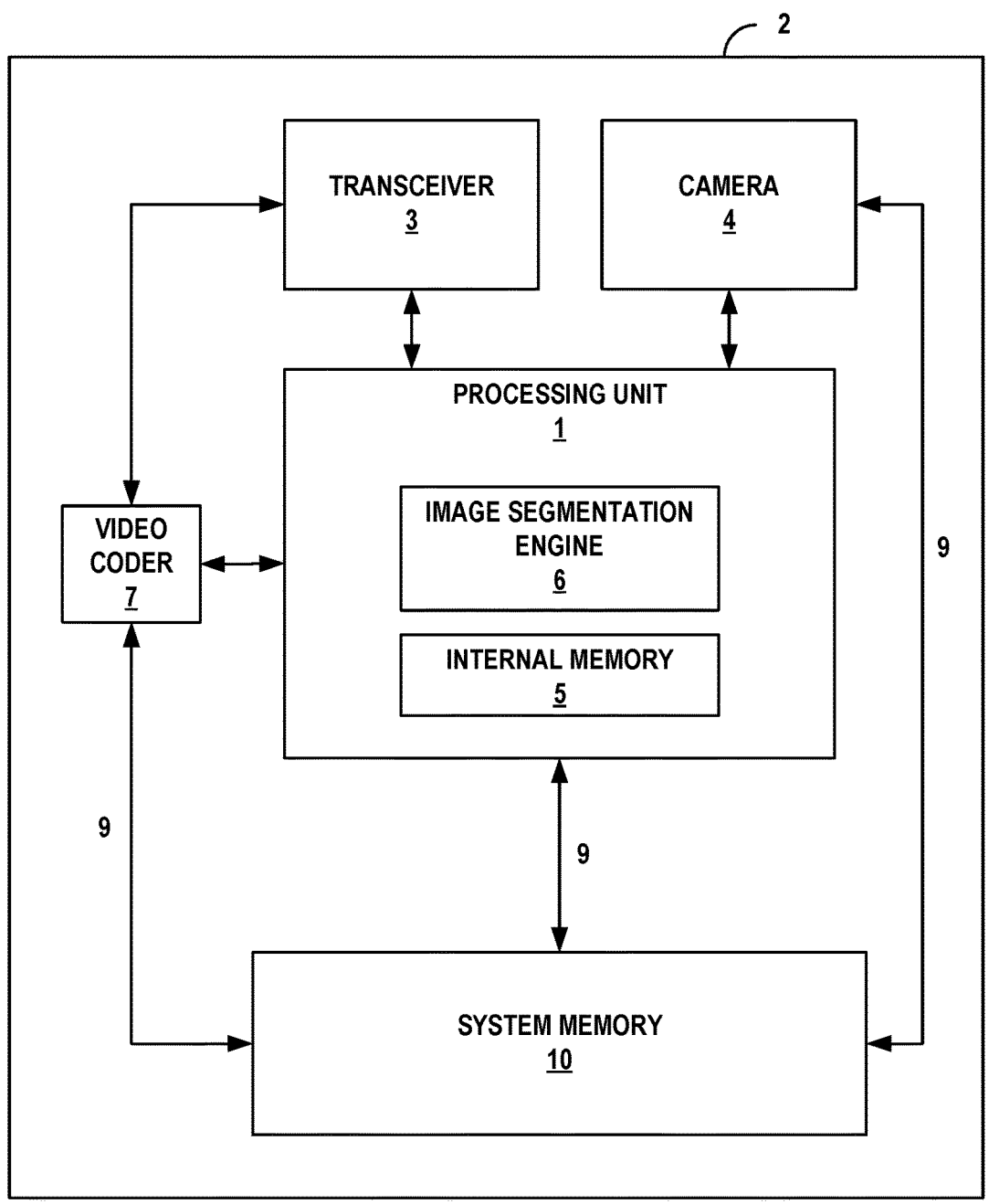
FIG. 1A is a block diagram showing an example computing device configured to use the techniques of this disclosure.

In general, this disclosure describes techniques for image and/or video processing, and more specifically, the encoding and decoding (e.g., compressing and decompressing) of image segmentation data. For example, this disclosure describes techniques for encoding and decoding (e.g., compressing and decompressing) image segmentation data.

As used herein, the term "image" may refer to a single image, one or more images, one or more images amongst a plurality of images corresponding to a video, a plurality of images corresponding to a video (e.g., all of the images corresponding to the video or less than all of the images corresponding to the video), a sub-part of a single image, a plurality of sub-parts of a single image, a plurality of sub-parts corresponding to a plurality of images, image data, and the like. In this regard, as described herein, applying the techniques described herein to an image may refer to applying the techniques described herein to a single image, one or more images, one or more images amongst a plurality of images corresponding to a video, a plurality of images corresponding to a video (e.g., all of the images corresponding to the video or less than all of the images corresponding to the video), a sub-part of a single image, a plurality of sub-parts of a single image, a plurality of sub-parts corresponding to a plurality of images, image data, and the like. A sub-part of an image may refer to one or more tiles or other smaller part or combination of parts lesser than the whole image. As used herein, a video may be a plurality of images that may be presented in a sequence.

As used herein, image processing may refer to video processing, and video processing may refer to image processing since it is understood that a video comprises a plurality of images.

A processing unit (e.g., processing unit 1 described in more detail below) configured to generate image segmentation data may be configured to perform image segmentation on, for example, one or more images of a plurality of images (e.g., a video). For example, a processing unit configured to generate image segmentation data may receive a plurality of images (e.g., in the form of a video, for example) and perform image segmentation on one or more images of the plurality of images. As part of the image segmentation process, image segmentation data may be generated. As used herein, image segmentation may refer to background and/or foreground detection, background separation and/or foreground separation, background and/or foreground identification, and the like. For example, as used herein, image segmentation may refer to one or more processes in which pixels corresponding to the background of an image may be identified as background pixels, and pixels corresponding to the foreground of the image may be identified as foreground pixels.

As used herein, the term "background" may refer to one or more parts (e.g., one or more pixels, objects, areas, or other identifiers) of an image that constitute the background. For example, the background of an image may refer to the static, motionless, and/or inactive part or parts of the image in relation to one or more other images of a plurality of images with which the image is also associated (e.g., the image and the one or more other images in this example may each constitute a different frame in the same video). Similarly, the term "foreground" may refer to one or more parts (e.g., one or more pixels, objects, areas, or other identifiers) of an image that constitute the foreground. For example, the foreground of an image may refer to the part or parts of the image that are dynamic, moving, and/or active in relation to one or more other images of a plurality of images with which the image is also associated (e.g., the image and the one or more other images in this example may each constitute a different frame in the same video). As another example, the background may refer to the static (e.g., motionless or inactive) pixels in a video (e.g., a plurality of images) and the foreground may refer to the dynamic (e.g., moving or active) pixels in the video. In other examples, the term background may refer to the part or parts of an image determined to be the background and the term foreground may refer to the part or parts of the image determined to the foreground. In other examples, the term background may refer to the part or parts of an image that are not considered to be the foreground, and the term foreground may refer to the part or parts of the image that are not considered to be the background.

Referring to a simple example video of a rotating multicolored ball moving across a black canvas, the ball may be considered the foreground (or foreground object) and the black canvas may be considered the background. Image segmentation may refer to the process of determining the background and/or foreground of an image. For example, referring to the video example involving the moving ball, image segmentation may result in generation of image segmentation data that identifies or may be used to identify the ball in one or more images of the video as the foreground and the black canvas in one or more images of the video as the background. It is understood that many techniques of image segmentation exist and that the examples of image segmentation described herein are non-limiting examples.

As used herein, "image segmentation data" may refer to any data that identifies or may be used to identify the background and/or foreground of one or more images, such as one or more images of a plurality of images (e.g., a video). For example, "image segmentation data" may refer to data related to one or more Gaussian Mixture Models (GMMs), or more simply, may refer to Gaussian Mixture Model (GMM) data. As another example, "image segmentation data" may refer to data related to Eigenbackground models or any other image segmentation data related to any model, process, technique, or the like for determining the background and/or foreground of an image.

Image segmentation data may refer to pixel-level data. In such an example, image segmentation data may include image segmentation data for each pixel of the one or more images for which the image segmentation data identifies or may be used to identify the background and/or foreground. Referring to the GMM data example, for an image modeled by one or more GMMs, each of the one or more GMMs may include one or more GMM parameter values for each pixel of the image. In some examples, each of the one or more GMMs may include a mean value, a variance value, and a weight value for each pixel in the image. In such examples, the mean value may be a first GMM parameter value, the variance value may be a second GMM parameter value, and the weight value may be a third GMM parameter value. For an image modeled by two GMMs, the first GMM may include a first mean value, a first variance value, and a first weight value for each pixel of the image, and the second GMM may include a second mean value, a second variance value, and a second weight value for each pixel of the image. In these examples, the GMM data may be referred to as pixel-level data.

A processing unit configured to generate image segmentation data may encounter increased processing demands, use up more storage resources (e.g., memory) and communication resources (e.g., memory pipeline bandwidth, transmission pipeline bandwidth), and the like as the number of pixels in the images of a video increases and/or as the number of frames per second of the video increases. For example, referring to the example where image segmentation data refers to GMM data, since GMM data may be on a per pixel basis, the GMM data increases as the resolution and/or frames per second of the video increases. In this regard, as the amount of GMM data increases, so too does the memory required to store the GMM data on a memory and/or transmit the GMM data over a wired or wireless communication medium.

One or more techniques of this disclosure include reducing the size of the image segmentation data to reduce its memory footprint (e.g., reduce the amount of memory required to store the image segmentation data), reduce transmission resource consumption (e.g., bandwidth), and/or result in encryption. In some examples, reducing transmission resource consumption (e.g., bandwidth) may refer to reducing the amount of bandwidth consumed between components of the same computing device. In other examples, reducing transmission resource consumption (e.g., bandwidth) may refer to reducing the amount of bandwidth consumed between two different computing devices (e.g., between components of different computing devices).

For example, the techniques of this disclosure include compressing and/or decompressing (e.g., encoding and/or decoding) image segmentation data (e.g., GMM data) using one or more video coding techniques. It is understood that reference to decompressing image segmentation data refers to decompressing compressed image segmentation data. In some examples, compressing and/or decompressing image segmentation data using video coding techniques may: reduce the amount of memory consumed by storing encoded image segmentation data in a memory instead of storing native (e.g., uncompressed) image segmentation data, reduce the bandwidth required to transmit image segmentation data over a wired or wireless communication medium, and/or result in encryption since any resulting compressed (e.g., encoded) and uncompressed (e.g., decoded) images representative of the image segmentation data would be visually unrecognizable as pertaining to image segmentation data.

For example, one or more techniques of this disclosure include compressing and/or decompressing (e.g., encoding and/or decoding) GMM data using video coding techniques. In some examples, compressing GMM data using video coding techniques may: reduce the amount of memory consumed by storing encoded GMM data in a memory instead of storing native (e.g., unencoded) GMM data, reduce the bandwidth required to transmit GMM data over a wired or wireless communication medium, and/or result in encryption since any resulting encoded (and decoded) images representative of the GMM data would be visually unrecognizable as pertaining to GMM data.

Referring now to FIG. 1A, FIG. 1A is a block diagram illustrating an example computing device (e.g., computing device 2) and/or a processing unit (e.g., processing unit 1) that may be configured to implement one or more aspects of this disclosure. As shown in FIG. 1A, computing device 2 may be, for example, a personal computer, a desktop computer, a laptop computer, a tablet computer, a computer workstation, a video game platform or console, a mobile telephone (e.g., a cellular or satellite telephone), a handheld device (e.g., a portable video game device or a personal digital assistant (PDA)), a wearable computing device, a personal music player, a video player, a display device, a television, a network device, an intermediate network device, a video camera, a security camera, an IP camera (e.g., an IP surveillance camera), a camera device, a drone (e.g., a drone including a camera, such as an IP camera), a device including a camera, any computing device, or any other type of device that may be configured to receive, transmit, encode, decode, and/or generate image segmentation data. It is understood that reference herein to "camera" may refer to "video camera." For example, reference to an IP camera may include reference to an IP video camera. Similarly, reference to a drone including a camera may include reference to a drone including a video camera.

In some examples, as described herein, one or more techniques of this disclosure enable a computing device, such as an IP camera, configured to implement one or more aspects of this disclosure to reduce the size of the image segmentation data to (1) reduce its memory footprint (e.g., reduce the amount of memory required to store the image segmentation data), (2) reduce transmission resource consumption (e.g., bandwidth) when sending image segmentation data, and/or (3) result in encryption of the image segmentation data. In this regard, it is understood that one or more benefits may be derived by reducing the size of image segmentation data.

For example, in the context of an IP camera, an IP camera may be part of a system including a video server. The IP camera may be communicably coupled (e.g., wired or wirelessly or a combination thereof) to the video server. The video server may be configured with a memory (e.g., a system memory such as DDR memory). The video server may be configured to store video data captured by the IP camera. By reducing the size of the image segmentation data, the IP camera may, in some examples, be configured to perform image segmentation on captured video data (e.g., high resolution captured video) because the resulting image segmentation data may be compressed thereby reducing bandwidth consumption when transmitted to a memory for storage. For example, a majority of the bandwidth may be consumed by the transmission of high resolution video to the video server by the IP camera. Accordingly, in some examples, as the size of image segmentation data increases, there may not be enough bandwidth to transmit the image segmentation data due to the available bandwidth.

Absent reducing the size of image segmentation data, the IP camera may be configured to reduce the amount of image segmentation data generated by downscaling captured video data to lower resolution, and performing image segmentation on the lower resolution video data. However, performing image segmentation on downscaled video data results in lower quality and/or less accurate image segmentation data by virtue of performing the image segmentation on downscaled images instead of images having higher resolution. In this regard, by reducing the size of image segmentation data, a computing device (e.g., an IP camera) may be configured to perform image segmentation on high resolution images (e.g., non-downscaled video) thereby not sacrificing the quality and/or accuracy of the image segmentation by otherwise performing the image segmentation data on lower resolution images. It is understood that the techniques described herein may be applied to any image segmentation data, whether the image segmentation data was derived from a downscaled, upscaled, or original image (e.g., an image part of a video). The example above pertains to one example in which downscaling images to perform image segmentation may be avoided by implementing one or more techniques described herein. However, it is understood that, despite this example, the techniques may still apply to any image segmentation data.

As another example, absent reducing the size of image segmentation data, the IP camera may be configured to reduce the amount of image segmentation data generated by not performing image segmentation, and instead rely on the video server or other server to perform image segmentation. However, in such examples, the offloading of image segmentation to a server may unnecessarily tie up system resources of the server. Additionally, in such examples, by offloading image segmentation to a server instead of having the computing device (e.g., IP camera) perform image segmentation, the image segmentation data may no longer be performed in real-time with the capture of the images (e.g., video). Accordingly, it is understood that the techniques described herein may enable a computing device, such as an IP camera, to perform image segmentation in real-time (e.g., perform image segmentation on video as it is captured). Similarly, it is understood that the techniques described herein may enable a computing device, such as an IP camera, to avoid offloading image segmentation to another device.

In the example of FIG. 1A, computing device 2 may include processing unit 1, transceiver 3, camera 4, video coder 7, and system memory 10. The various modules, components, engines, units, and the like shown in computing device 2 in the example of FIG. 1A may not be necessary in every example of computing device 2.

Processing unit 1 may be a central processing unit (CPU), a graphics processing unit (GPU), a system on chip (SoC), or any other processing unit that may be configured to perform image segmentation and/or generate image segmentation data. Processing unit 1 may include one or more processors (e.g., one or more microprocessors), application specific integrated circuits (ASICs), field programmable gate arrays (FPGAs), arithmetic logic units (ALUs), digital signal processors (DSPs), discrete logic, software, hardware, firmware, other equivalent integrated or discrete logic circuitry, or any combinations thereof. Processing unit 1 may also include one or more processor cores, so that processing unit 1 may be referred to as a multi-core processor. In some examples, processing unit 1 may be specialized hardware that includes integrated and/or discrete logic circuitry that provides processing unit 1 with massive parallel processing capabilities suitable for graphics processing. The techniques of this disclosure apply to any processing unit that may be configured to perform image segmentation and/or generate image segmentation data.

As shown in FIG. 1A, processing unit 1 may include internal memory 5 and image segmentation engine 6. In some examples, the image segmentation engine 6 may include one or more processors (e.g., one or more microprocessors), application specific integrated circuits (ASICs), field programmable gate arrays (FPGAs), arithmetic logic units (ALUs), digital signal processors (DSPs), discrete logic, software, hardware, firmware, other equivalent integrated or discrete logic circuitry, or any combinations thereof of processing unit 1. In examples where image segmentation engine 6 is partially or fully implemented using software, the software may be executed by processing unit 1 and may be stored on a memory (e.g., on-chip memory such as internal memory 5 or off-chip memory such as system memory 10). Processing unit 1 may be configured to access and execute the software instructions stored on the memory to implement one or more aspects of image segmentation engine 6.

Processing unit 1, which may be configured to receive, transmit, encode, decode, and/or generate image segmentation data for one or more images of a video, may be integrated into any computing device. For example, processing unit 1 may be integrated with a computing device such as a video camera (e.g., a security camera). In the video camera example, processing unit 1 may be integrated in the video camera, a server that may be communicatively coupled (e.g., via a wired or wireless communication medium) with the video camera, or other computing device that may be communicatively coupled (e.g., via a wired or wireless communication medium) with the video camera.

Referring now to FIG. 1A, memory external to processing unit 1, such as depicted system memory 10, may be accessible to processing unit 1. For example, processing unit 1, camera 4, and/or video coder 7 may be communicatively coupled to system memory 10 over a bus (e.g., any communication medium, whether wired or wireless). In some examples, processing unit 1, camera 4, and/or video coder 7 may be directly communicatively coupled to system memory 10 via a communication medium such as bus 9. In other examples, processing unit 1, camera 4, and/or video coder 7 may be indirectly communicatively coupled to system memory 10 via a communication medium such as a bus. For example, processing unit 1, camera 4, and/or video coder 7 may be communicatively directly coupled to another component (e.g., a different processing unit) which is directly communicatively coupled to system memory 10 via a communication medium such as a bus.

Internal memory 5 may include one or more volatile or non-volatile memories or storage devices, such as, e.g., random access memory (RAM), static RAM (SRAM), dynamic RAM (DRAM), erasable programmable ROM (EPROM), electrically erasable programmable ROM (EEPROM), Flash memory, a magnetic data media or an optical storage media, any on-chip memory (e.g., any integrated memory of processing unit 1), or any other internal memory.

System memory 10 may similarly include one or more volatile or non-volatile memories or storage devices, such as, e.g., random access memory (RAM), static RAM (SRAM), dynamic RAM (DRAM), erasable programmable ROM (EPROM), electrically erasable programmable ROM (EEPROM), Flash memory, SDRAM DDR SDRAM, a magnetic data media or an optical storage media, any off-chip memory (e.g., any memory external to processing unit 1), or any other memory. System memory 10 may be a non-transitory storage medium according to some examples. The term "non-transitory" may indicate that the storage medium is not embodied in a carrier wave or a propagated signal. However, the term "non-transitory" should not be interpreted to mean that system memory 10 is non-movable or that its contents are static. As one example, system memory 10 may be removed from any device with which it is communicatively coupled, and moved to another device. As another example, memory, substantially similar to system memory 10, may be inserted into a computing device, such as computing device 2 depicted in FIG. 1A.

Transceiver 3 may include circuitry to allow wireless or wired communication between computing device 2 and another device or a network. Transceiver 3 may include modulators, demodulators, amplifiers and other such circuitry for wired or wireless communication. In some examples, transceiver 3 may be integrated with processing unit 1.

Camera 4 may be a video camera (e.g., an internet protocol (IP) camera) configured to capture a plurality of images in sequence. Camera 4 may be configured to store any captured images to system memory 10 and/or internal memory 5. For example, camera 4 may be configured to store any capture images to system memory 10. In such an example, processing unit 1 may be configured to retrieve one or more images corresponding to a video stored in system memory 10 for processing. For example, processing unit 1 may be configured to retrieve one or more images stored in system memory 10 that were captured by camera 4, and generate image segmentation data for the retrieved one or more images. In some examples, processing unit 1 may be configured with image segmentation engine 6 to generate image segmentation data for one or more images received by processing unit 1. Image segmentation data may include one or more image segmentation values for each pixel of an image.

As another example, system memory 10 may be configured to store one or more images of a video not captured by camera 4. In such an example, the one or more images of the video not captured by camera 4 may be received from another source, such as from a device or server different from computing device 2. In this example, computing device 2 may initially receive the one or more images of video not captured by camera 4 from transceiver 3. In the example shown in FIG. 1A, transceiver is shown as being communicatively coupled with processing unit 1 and video coder 7. In other examples, transceiver may be communicatively coupled with processing unit 1, camera 4, and system memory 10. In some examples, processing unit 1 may receive one or more images of a video received by transceiver 3 and store the one or more images in system memory 10 and/or internal memory 5. In other examples, transceiver 3 may directly store any received images to system memory 10.

Figure 1B:
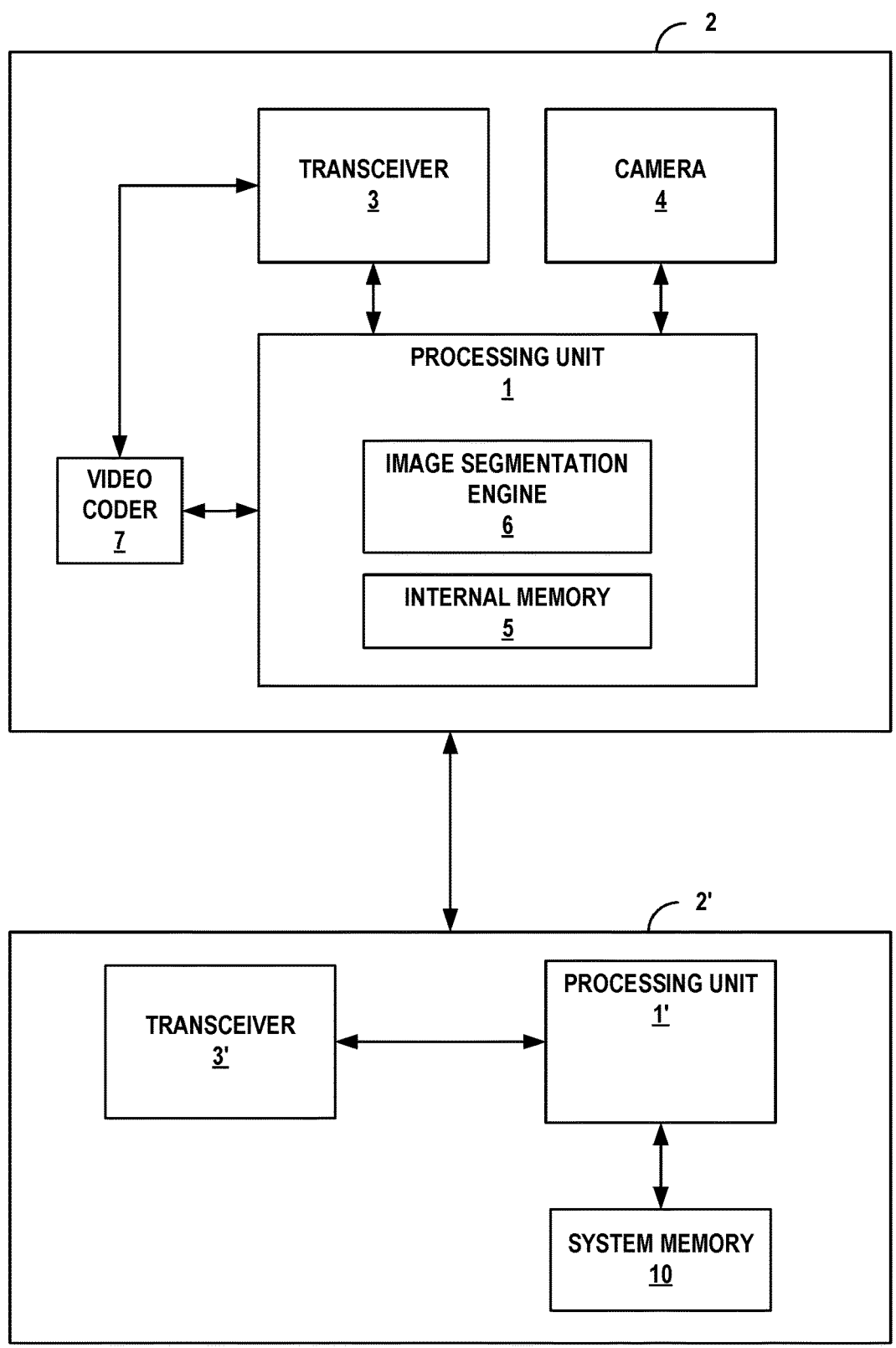
FIG. 1B is a block diagram showing an example computing device configured to use the techniques of this disclosure.

In some examples, system memory 10 may be on a computing device different from computing device 2. FIG. 1B illustrates such an example. The example of FIG. 1B illustrates computing device 2 communicably coupled (e.g., wired, wirelessly, or a combination thereof) to a second computing device 2'. Computing device 2' may include a processing unit 1'. In some examples, computing device 2' may be a server or any other computing device having system memory 10. For example, in an example where computing device 2 is an IP camera, computing device 2' may be a video server. Components having the same reference number between FIGS. 1A and 1B are the same components and operate in the same way with one difference: computing device 2 may be configured to send data to computing device 2' for storage thereon (e.g., for storing data on system memory 10 of computing device 2'). For example, computing device 2 may be configured to send data to computing device 2' using transceiver 3. Computing device 2' may be configured to receive data from and send data to computing device 2 using transceiver 3'. For example, computing device 2 may be configured to send encoded image segmentation data to computing device 2' for storage on system memory 10 of computing device 2'. In such an example, computing device 2' may be configured to store encoded image segmentation data received from computing device 2 on system memory 10. Similarly, computing device 2' may be configured to send encoded image segmentation data to computing device 2. In such an example, computing device 2 may be configured to decode the encoded image segmentation data received from computing device 2'.

Processing unit 1' may be any processing unit, such as a central processing unit (CPU), a graphics processing unit (GPU), a system on chip (SoC), or any other processing unit. Processing unit 1' may include one or more processors (e.g., one or more microprocessors), application specific integrated circuits (ASICs), field programmable gate arrays (FPGAs), arithmetic logic units (ALUs), digital signal processors (DSPs), discrete logic, software, hardware, firmware, other equivalent integrated or discrete logic circuitry, or any combinations thereof. Processing unit 1' may also include one or more processor cores, so that processing unit 1' may be referred to as a multi-core processor. In some examples, processing unit 1' may be specialized hardware that includes integrated and/or discrete logic circuitry that provides processing unit 1' with massive parallel processing capabilities suitable for graphics processing.

Transceiver 3' may include circuitry to allow wireless or wired communication between computing device 2' and another device or a network (e.g., computing device 2). Transceiver 3' may include modulators, demodulators, amplifiers and other such circuitry for wired or wireless communication. In some examples, transceiver 3' may be integrated with processing unit 1'.

Referring back to FIG. 1A, video coder 7 may be a video encoder and/or a video decoder. Video coder 7 may be a separate component from processing unit 1 as shown in FIG. 1A. In other examples, video coder 7 may be integrated with processing unit 1. In some examples, video coder 7 may include one or more processors (e.g., one or more microprocessors), application specific integrated circuits (ASICs), field programmable gate arrays (FPGAs), arithmetic logic units (ALUs), digital signal processors (DSPs), discrete logic, software, hardware, firmware, other equivalent integrated or discrete logic circuitry, or any combinations thereof of processing unit 1 or a component different from processing unit 1. It is therefore understood that transceiver 3 and/or video coder 7 may be part of the same integrated circuit (IC) as processing unit 1, may be external to the IC or ICs that may include part or all of processing unit 1, or may be formed in an IC that is external to the IC or ICs that may include part or all of processing unit 1. For example, video coder 7 may be implemented as any of a variety of suitable encoder circuitry, such as one or more microprocessors, digital signal processors (DSPs), application specific integrated circuits (ASICs), field programmable gate arrays (FPGAs), arithmetic logic units (ALUs), discrete logic, software, hardware, firmware or any combinations thereof.

In examples where video coder 7 is partially or fully implemented using software, the software may be executed by processing unit 1 or a processing unit different from processing unit 1, and the software may be stored on a memory (e.g., on-chip memory such as internal memory 5 or off-chip memory such as system memory 10). Processing unit 1 may be configured to access and execute the software instructions stored on the memory to implement one or more aspects of video coder 7.

As used herein, the term "video coder" may refer to a video encoder and/or a video decoder. In this disclosure, the term "video coding" may refer to video encoding and/or video decoding, and the term "coding" may refer to encoding and/or decoding. Video coder 7 may be configured to code image data according to a video coding standard or a video coding specification. In some examples, a video coding standard may include H.263, H.264, H.265, or any video coding standard or specification different from H.263, H.264, and H.265. Video coder 7 represents an example of a component of computing device 2 that may be configured to perform one or more video coding techniques in accordance with a video coding standard or specification. For example, video coder 7 may be configured to code image segmentation data (e.g., image segmentation data converted or otherwise packed into image data). Video coder 7 may be configured to code image segmentation data or image data representative of image segmentation data.

Image segmentation engine 6 may be configured to receive (e.g., from internal memory 5 of processing unit 1 or from a memory external to processing unit 1 such as system memory 10) or generate image segmentation data for an image. In some examples, image segmentation engine 6 may be configured to receive the image for which image segmentation engine 6 may be configured to generate image segmentation data from a memory (e.g., internal memory 5 of processing unit 1 or from a memory external to processing unit 1 such as system memory 10) or from camera 4. The image may be one image of a plurality of images of a video. The image may include a plurality of pixels with each pixel being represented by one or more image component values. The image segmentation data may include one or more image segmentation values for each pixel an image.

As used herein, the term "image component value" refers to a value used to represent a channel corresponding to a color space by which the image is represented. For example, the RGB color space includes the red component channel, the green component channel, and the blue component channel. In this example, a pixel in the RGB color space may be represented by three image component values: a first image component value for the red component channel, a second image component value for the green component channel, and a third image component value for the blue component channel. As another example, the YCbCr color space includes the luma component channel, the blue chroma component channel, and the red chroma component channel. In this example, a pixel in the YCbCr color space may be represented by three image component values: a first image component value for the luma component channel, a second image component value for the blue chroma component channel, and a third image component value for the red chroma component channel.

Image segmentation engine 6 may be configured to convert image segmentation data into image data. The image data may be referred to as converted image data. Image segmentation engine 6 may be configured to convert image segmentation data into image data that a video coder (e.g., video coder 7) is configurable to encode and/or decode. For example, image segmentation engine 6 may be configured to convert image segmentation data into image data having a format that is recognizable by and/or acceptable to a video coder (e.g., video coder 7).

Image segmentation data may not itself be an image. Instead, image segmentation data represents information related to the image. It is therefore understood that image segmentation engine 6 may be configured to convert non-image data (e.g., image segmentation data) into image data that may be coded (e.g., encoded) by video coder 7. The image data may be in a format that that video coder 7 is configurable to encode and/or decode. For example, the image data may include one or more image component values.

In some examples, image segmentation engine 6 may be configured to convert an image segmentation value into an image component value by using the image segmentation value as the image component value. In other examples, image segmentation engine 6 may be configured to convert an image segmentation value into an image component value by using a look up table (LUT) that maps image segmentation values to image component values (and vice versa). For example, image segmentation engine 6 may be configured to convert a GMM parameter mean value into an image component value by using a first LUT. Similarly, image segmentation engine 6 may be configured to convert a GMM parameter variance value into an image component value by using a second LUT and image segmentation engine 6 may be configured to convert a GMM parameter weight value into an image component value by using a first LUT. In other examples, image segmentation engine 6 may be configured to convert GMM parameter values corresponding to mean, variance, and weight using the same LUT (e.g., a single LUT). In some examples, use of a LUT may result in quantization of an image segmentation value.

In other examples, image segmentation engine 6 may be configured to convert an image segmentation value into two or more image component values. For example, in an example where the bit-length of an image segmentation value is N bits (where N is a positive integer) and the bit-length of an image component value is N/2 bits, then image segmentation engine 6 may be configured to use the first N/2 bits of the image segmentation value for a first image component value and the second N/2 bits of the image segmentation value for a second image component value. In such an example, the first image component may be packed as part of a first image sent to a video coder and the second image component may be packed as part of a second image component sent to the video coder. Image segmentation engine 6 may be configured to then concatenate data that it split to reverse the process. For example, the first image and second image may be encoded by a video coder and stored in a memory. The encoded first and second images may be decoded by a video coder. Image segmentation engine 6 may receive the decoded first and second images and may be configured to reverse the packing (e.g., conversion) process. In this example with two images, image segmentation engine 6 may concatenate the N/2 pixel data (e.g., component data) for the decoded first and second images to obtain the N-bit image segmentation value corresponding to each pixel location.

In some examples, the one or more image component values used to represent the image segmentation data may be in the same color space as the one or more image component values corresponding to the image. For example, the image component values corresponding to the image may be in one or more channels of the RGB color space and the image component values corresponding to the image data representative of the image segmentation data may be in one or more channels of the RGB color space. In other examples, the one or more image component values used to represent the image segmentation data may be in a different color space as the one or more image component values corresponding to the image. For example, the image component values corresponding to the image may be in one or more channels of the RGB color space and the image component values corresponding to the image data representative of the image segmentation data may be in one or more channels of a color space different from RGB (e.g., YCbCr).

In some examples, image segmentation data may refer to data related to one or more Gaussian Mixture Models (GMMs), or more simply, may refer to Gaussian Mixture Model (GMM) data. Image segmentation data (e.g., GMM data) may include image segmentation data for each pixel of the image for which the image segmentation data was generated by image segmentation engine 6 or the image with which the received image segmentation data is associated.

Referring to the example where image segmentation data includes GMM data, such an example means that image segmentation engine 6 may be configured to model the image using one or more GMMs. Image segmentation engine 6 may be configured to model the image using one or more GMMs for each pixel. For example, each of the one or more GMMs may include one or more GMM parameter values for each pixel of the image. In some examples, each of the one or more GMMs may include a mean value, a variance value, and a weight value for each pixel in the image. In such examples, the mean value may be a first GMM parameter value, the variance value may be a second GMM parameter value, and the weight value may be a third GMM parameter value. For an image modeled by two GMMs, the first GMM may include a first mean value, a first variance value, and a first weight value for each pixel of the image, and the second GMM may include a second mean value, a second variance value, and a second weight value for each pixel of the image. In these examples, the GMM data may be referred to as pixel-level data.

As described above, image segmentation engine 6 may be configured to convert image segmentation data into image data. As one example, image segmentation engine 6 may be configured to convert one or more GMM parameter values into image data. For example, image segmentation engine 6 may be configured to convert a first GMM parameter value (e.g., a mean value) of a GMM for each pixel to an image component value corresponding to a first channel (e.g., the luma component channel) in a color space (e.g., the YCbCr color space). Image segmentation engine 6 may be configured to convert a second GMM parameter value (e.g., a variance value) of a GMM for each pixel to an image component value corresponding to a second channel (e.g., the blue chroma component channel) in a color space (e.g., the YCbCr color space). Image segmentation engine 6 may be configured to convert a third GMM parameter value (e.g., a weight value) of a GMM for each pixel to an image component value corresponding to a third channel (e.g., the blue chroma component channel) in a color space (e.g., the YCbCr color space). In other examples, image segmentation engine 6 may be configured to convert one or more GMM parameter values of a GMM for each pixel to one or more image component values corresponding to the same channel.

As another example, image segmentation engine 6 may be configured to convert one or more GMM parameter values into image data. For example, image segmentation engine 6 may be configured to convert a first GMM parameter value (e.g., a mean value) of a GMM for each pixel to an image component value corresponding to a channel (e.g., a grayscale component channel) in a color space (e.g., the grayscale color space). Image segmentation engine 6 may be configured to convert a second GMM parameter value (e.g., a variance value) of a GMM for each pixel to an image component value corresponding to the channel (e.g., a grayscale component channel) in a color space (e.g., the grayscale color space). Image segmentation engine 6 may be configured to convert a third GMM parameter value (e.g., a weight value) of a GMM for each pixel to an image component value corresponding to the channel (e.g., a grayscale component channel) in a color space (e.g., the grayscale color space). In other examples, image segmentation engine 6 may be configured to convert one or more GMM parameter values of a GMM for each pixel to one or more image component values corresponding to the same channel. In such an example, video coder 7 may be configured to encode the three frames of grayscale using depth map encoding techniques or other video coding techniques (e.g., intra or inter prediction coding techniques).

Image segmentation engine 6 may be configured to convert image segmentation data into one or more frames of image data. The number of frames may depend on the number of GMM parameter values. For example, segmentation engine 6 may be configured to convert image segmentation data into three frames of image data when a GMM having three parameter values is used to model the image. As another example, segmentation engine 6 may be configured to convert image segmentation data into N frames of image data when a GMM having N parameter values is used to model the image, where N is a whole number. In an example where image segmentation engine 6 is configured to generate image segmentation data based on one GMM having three GMM parameter values, the first frame of image data may represent the first GMM parameter values on a per pixel basis for a first GMM used to model the image. The second frame of image data may represent the second GMM parameter values on a per pixel basis for the first GMM used to model the image. The third frame of image data may represent the third GMM parameter values on a per pixel basis for the first GMM used to model the image.

In an example where image segmentation engine 6 is configured to generate image segmentation data based on more than one GMM, with each GMM having one or more GMM parameter values, image segmentation engine 6 may be configured to generate a frame of image data for each GMM parameter value for each GMM. For example, image segmentation engine 6 may be configured to generate image segmentation data for the image based on five GMMs with each of the five GMMs having three GMM parameter values. In such an example, each pixel of the image may have corresponding thereto fifteen GMM parameter values. Image segmentation engine 6 may convert the GMM parameter values for each GMM into a frame of image data.

As described above, video coder 7 may be configured to code image segmentation data or image data representative of image segmentation data. Accordingly, while techniques described herein may refer to generating or receiving image segmentation data for an image of a plurality images, it is understood that such techniques may apply to one or more other images of the plurality images because video coder 7 may be configured to utilize intra-coding and inter-coding techniques to encode and/or decode image segmentation data or image data representative of image segmentation data.

It is understood that image segmentation data may be converted into image data in various ways to utilize different video coding techniques. In this regard, image segmentation engine 6 may be configured to analyze generated or received image segmentation data to determine how to convert the image segmentation data into image data for video coding. For example, for an image represented by a GMM that includes a small range of values for mean, variance, and/or weight, image segmentation engine 6 may convert the mean, variance, and/or weight values corresponding to the GMM in into image data in such a way that a palette mode coding technique (or any video coding technique) may be applied to such image data. For example, image segmentation engine 6 may convert the mean, variance, and/or weight values corresponding to the GMM in into image data in such a way that intra prediction and/or inter prediction video coding techniques may be applied to such data. In this regard, in some examples, image segmentation engine 6 may be configured to instruct a video coder (e.g., video coder 7) to code the image data using a particular technique. In other examples, image segmentation engine 6 may convert image segmentation data into image data to ensure that video coder 7 can operate thereon, and image segmentation engine 6 may rely on video coder 7 to determine which video coding technique is to be applied to the converted image data. Image segmentation engine 6 may be configured to send any image data representative of image segmentation data to video coder 7 for coding (e.g., encoding).

In some examples, processing unit 1 and/or one or more components of computing device 2 may be configured to receive, transmit, encode, decode, and/or generate image segmentation data (e.g., Gaussian Mixture Model data) for one or more images of a video. One or more techniques described herein may be implemented in hardware, software, firmware, or any combination thereof. For example, where one or more techniques described herein are implemented in hardware, processing unit 1 may be such hardware or one piece of a plurality of hardware components configured to operate together to perform one or more techniques described herein. In such examples, the hardware may or may not be configured to execute software or firmware that may perform one or more techniques described herein when executed. Any software and/or firmware may be stored on a non-transitory storage medium, such on-chip memory of hardware (e.g., internal memory 5 of processing unit 1) or on external memory to any hardware (e.g., system memory 10).

Figure 2:
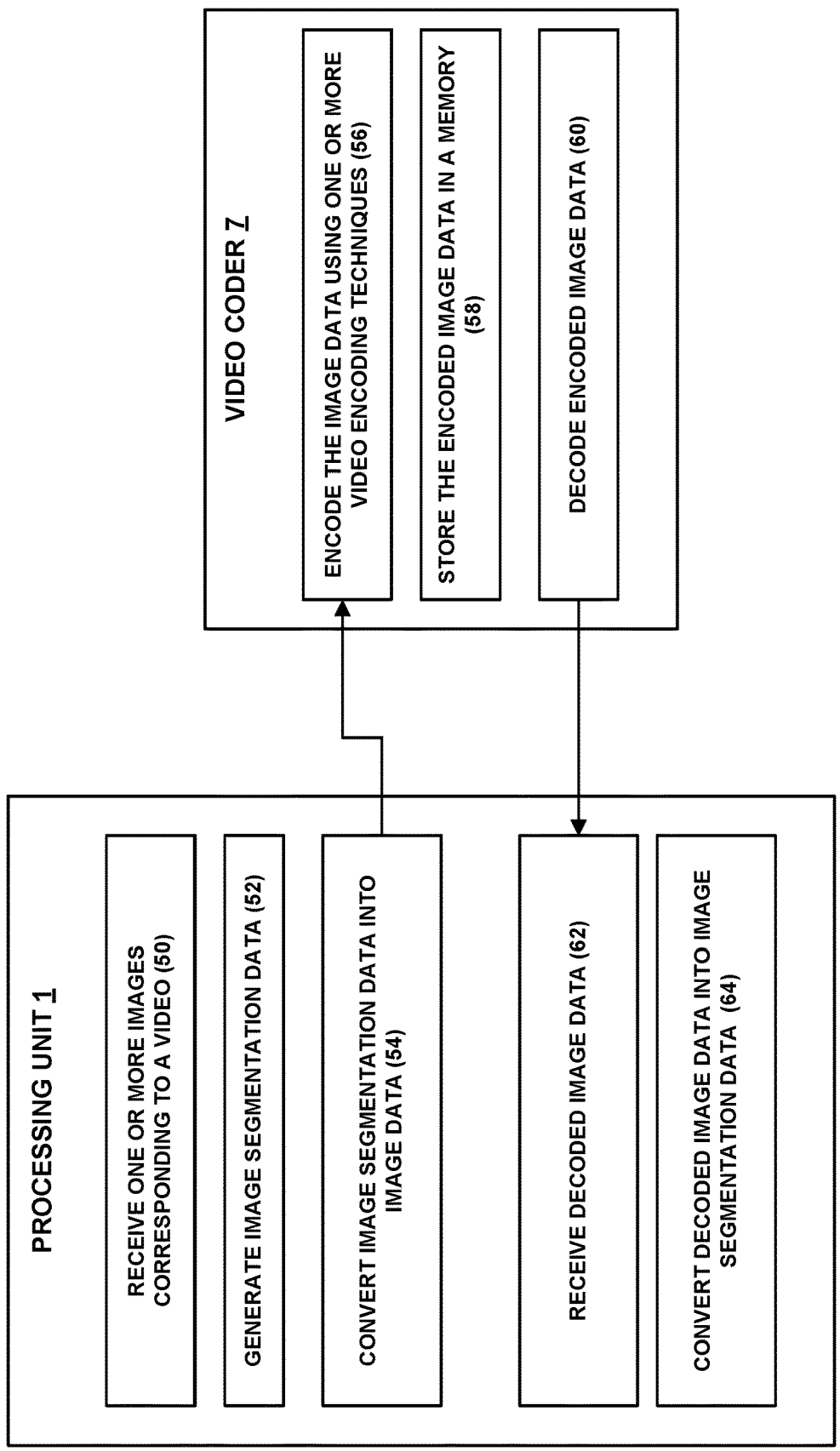
FIG. 2 illustrates one example of image processing in accordance with one or more techniques set forth herein.

FIG. 2 illustrates one example of image processing in accordance with one or more techniques set forth herein. The example of FIG. 2 is generally described with respect to one or more components of computing device 2.

In the example of FIG. 2, processing unit 1 (e.g., image segmentation engine 6 of processing unit 1) may be configured to receive one or more images corresponding to a video (50). The video may be a real-time or non-real-time video. For example, the video may be a streaming video, a video previously captured and stored, and the like. In some examples, processing unit 1 may be configured to receive the one or more images corresponding to the video from transceiver 3, camera 4, video coder 7, and/or a memory (e.g., internal memory 5 or system memory 10). As one example, the one or more images corresponding to the video may be received from transceiver 3 when the source of the video is not computing device 2. In such an example, the source of the video may be a server communicatively coupled to computing device 2 via transceiver 3. As another example, the one or more images corresponding to the video may be received from video coder 7 when the video first needs to be decoded. Upon decoding one or more images of the video, video coder 7 may be configured to send the decoded one or more images of the decoded video to processing unit 1. As another example, the one or more images corresponding to the video may be received from camera 4. As another example, the one or more images corresponding to the video may be received from a memory accessible by processing unit 1 (e.g., internal memory 5, system memory 10, or a memory not on computing device 2). The memory not on computing device 2 may refer to a memory on, for example, a server such as a web server. It is therefore understood that the one or more images corresponding to the video may be received from a memory accessible by processing unit 1 because the one or more images corresponding to the video may be stored on the memory. The one or more images corresponding to the video may be stored on the memory from transceiver 3, video coder 7, camera 4, and/or processing unit 1.

Processing unit 1 (e.g., image segmentation engine 6 of processing unit 1) may be configured to generate image segmentation data for at least one of the received one or more images corresponding to the video (52). In other examples, instead of receiving one or more images corresponding to a video and/or generating image segmentation data, processing unit 1 (e.g., image segmentation engine 6 of processing unit 1) may be configured to receive image segmentation data corresponding to one or more images corresponding to a video. The video may be a real-time or non-real-time video. For example, the video may be a streaming video, a video previously captured and stored, and the like. In some examples, processing unit 1 may be configured to receive the image segmentation data corresponding to the one or more images from transceiver 3, camera 4, and/or a memory (e.g., internal memory 5 or system memory 10). As one example, the image segmentation data corresponding to the one or more images may be received from transceiver 3 when the image segmentation data corresponding to one or more images are stored on a memory not on computing device 2. The memory not on computing device 2 may refer to a memory on a server, for example. In such an example, the server may be communicatively coupled to computing device 2 via transceiver 3. As another example, the image segmentation data corresponding to the one or more images may be received from camera 4. For example, camera 4 may be configured to perform one or more image segmentation techniques and share any image segmentation data with processing unit 1. As another example, the image segmentation data corresponding to the one or more images may be received from a memory accessible by processing unit 1 (e.g., internal memory 5, system memory 10, or a memory not on computing device 2). The memory not on computing device 2 may refer to a memory on, for example, a server. It is therefore understood that the image segmentation data corresponding to the one or more images may be received from a memory accessible by processing unit 1 because the image segmentation data corresponding to the one or more images may be stored on the memory. The image segmentation data corresponding to the one or more images may be stored on the memory from transceiver 3, camera 4, and/or processing unit 1.

Processing unit 1 (e.g., image segmentation engine 6 of processing unit 1) may be configured to convert image segmentation data into image data (54). The image data may be referred to as converted image data. Processing unit 1 may be configured to convert image segmentation data into image data that a video coder (e.g., video coder 7) is configurable to encode and/or decode. For example, processing unit 1 may be configured to convert image segmentation data into image data having a format that is recognizable by and/or acceptable to a video coder (e.g., video coder 7).

In some examples, processing unit 1 (e.g., image segmentation engine 6 of processing unit 1) may be configured to store image segmentation data and/or the image data in a memory (e.g., internal memory 5 or system memory 10). In other examples, processing unit 1 may be configured to reduce the memory footprint of image segmentation data and/or the image data (e.g., reduce the amount of memory required to store image segmentation data and/or the image data), reduce transmission resource consumption (e.g., bandwidth) required to send image segmentation data and/or the image data, and/or encrypt image segmentation data and/or the image data by encoding the image data using a video coder (e.g., video coder 7). For example, a video encoder (e.g., video coder 7 which may include or otherwise be a video encoder) may be configured to encode the image data generated at block 54 using one or more video coding techniques (56). In this example, the video encoder may be configured to encode image data according to a video coding standard or a video coding specification.

The video coder (e.g., video coder 7) may be configured to store the encoded image data in a memory (58). In some examples, the memory may include internal memory 5, system memory 10, or a memory not on computing device 2. The memory not on computing device 2 may refer to a memory on, for example, a server. In other examples, processing unit 1 (e.g., image segmentation engine 6 of processing unit 1) may be configured to receive the encoded image data from the video coder, and store the encoded image data in a memory (e.g., internal memory 5, system memory 10, or a memory not on computing device 2).

The video coder (e.g., video coder 7) may be configured to decode encoded image data (60). For example, processing unit 1 may be configured to instruct the video coder (e.g., video coder 7) to decode encoded image data at an appropriate time. For example, processing unit 1 may be configured to instruct the video coder to decode encoded image data when it is desired to perform image segmentation on the one or more images with which the image data is associated. As another example, processing unit 1 may be configured to instruct the video coder to decode encoded image data when it is desired to use the image segmentation data to perform select processing. In some examples, the select processing may include determining whether motion is present in the video with the one or more images are associated. In other examples, the select processing may include allocating, while recording the video for example, more bits for area determine to be part of the foreground, and less bits for an area determined to be part of the background. In some examples, processing unit 1 may be configured to instruct the video coder to decode encoded image data by having encoded image data stored on the memory sent to the video coder.

Processing unit 1 (e.g., image segmentation engine 6 of processing unit 1) may be configured to receive decoded image data from the video coder (e.g., video coder 7) (62). Processing unit 1 (e.g., image segmentation engine 6 of processing unit 1) may be configured to convert decoded image data into image segmentation data (64). The image segmentation data at generated at block 64 may be the same as or different from the image segmentation data encoded at block 56 depending on whether lossy or lossless coding techniques are used. For example, the process to decode encoded image data may be generally reciprocal to the encoding process. Processing unit 1 may be configured to perform image segmentation using the image segmentation data derived from the decoded image data.

Figure 3:
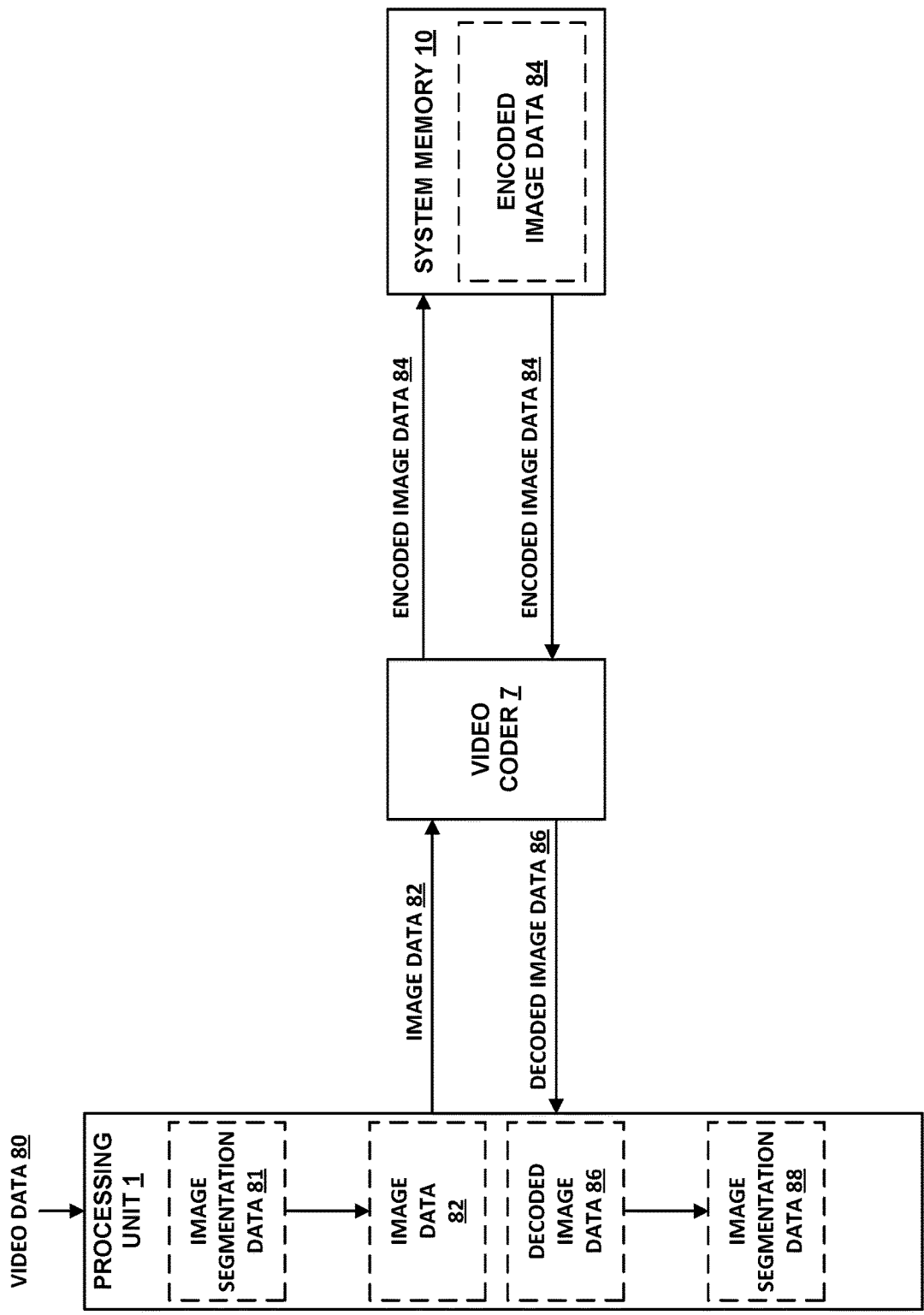
FIG. 3 illustrates one example of image processing in accordance with one or more techniques set forth herein.

FIG. 3 illustrates one example of image processing in accordance with one or more techniques set forth herein. The example of FIG. 3 is generally described with respect to one or more components of computing device 2.

In the example of FIG. 3, processing unit 1 may be configured to receive video data 80. Video data 80 may include a sequence of images (e.g., a sequence of frames) corresponding to real-time or non-real-time video. Processing unit 1 may be configured to generate image segmentation data 81 for video data 80. For example, processing unit 1 may be configured to generate image segmentation data 81 for multiple images (e.g., each image or less than each image) corresponding to video data 80. Each image for which image segmentation data is generated, different image data is generated. For example, a first frame of video may result in first image segmentation data being generated for the first frame of video followed by converting the first image segmentation data into image data representative of the first image segmentation data. A second frame of video may result in second image segmentation data being generated for the second frame of video followed by converting the second image segmentation data into image data representative of the second image segmentation data.

Processing unit 1 may be configured to convert image segmentation data 81 into image data 82. It is understood that image data 82 is not an actual image frame of video data 80; rather, image data 82 is image data representative of image segmentation data 81. Processing unit 1 may be configured to send image data 82 to video coder 7 (e.g., a video encoder and/or a video decoder). In some examples, video coder 7 may be a component of processing unit 1 (e.g., video coder 7 may be integrated into processing unit 1). In other examples, video coder 7 may not be a component of processing unit 1 (e.g., video coder 7 may be a separate physical component from processing unit 1).

Video coder 7 may be configured to compress image data 82 by encoding image data 82 using one or more video coding techniques. Video coder 7 may output encoded image data 84 to a memory (e.g., system memory 10) where the encoded (e.g., compressed) image data 84 may be stored. In other examples, processing unit 1 may be configured to receive encoded image data 84 from video coder 7 and then send encoded image data 84 to the memory (e.g., system memory 10). It is therefore understood that any description herein with respect a video coder storing encoded data directly to a memory may also be understood as disclosing that the video coder may output encoded data back to processing unit 1, which may then handle issuing the requisite requests to store the encoded data on a memory (e.g., system memory 10).

Processing unit 1 may be configured to retrieve encoded image data 84 from a memory (e.g., system memory 10). In some examples, processing unit 1 may be configured to instruct video coder 7 to retrieve encoded image data 84 from the memory. In such examples, video coder 7 may decode the encoded image data 84 in a process that may generally be reciprocal to the encoding process, and output decode image data 86 to processing unit 1. In other examples, processing unit 1 may be configured to retrieve encoded image data 84 from the memory, and provide the retrieved encoded image data 84 to video coder 7 for decoding thereof. In such examples, video coder 7 may decode the encoded image data 84 in a process that may generally be reciprocal to the encoding process, and output decode image data 86 to processing unit 1.

Processing unit 1 may be configured to receive decoded image data 86 and convert the received decoded image data 86 into image segmentation data 88. In some examples, image segmentation data 81 and image segmentation data 88 may be the same where a lossless encoding scheme is used. In some examples, image segmentation data 81 and image segmentation data 88 may not be the same where a lossy encoding scheme is used. In some examples, lossy compression may be based on a Haar transform, and lossy decompression may be based on an inverse Haar transform. Processing unit 1 may be configured to perform image segmentation using image segmentation data 88 derived from decoded image data 86.

Figure 4:
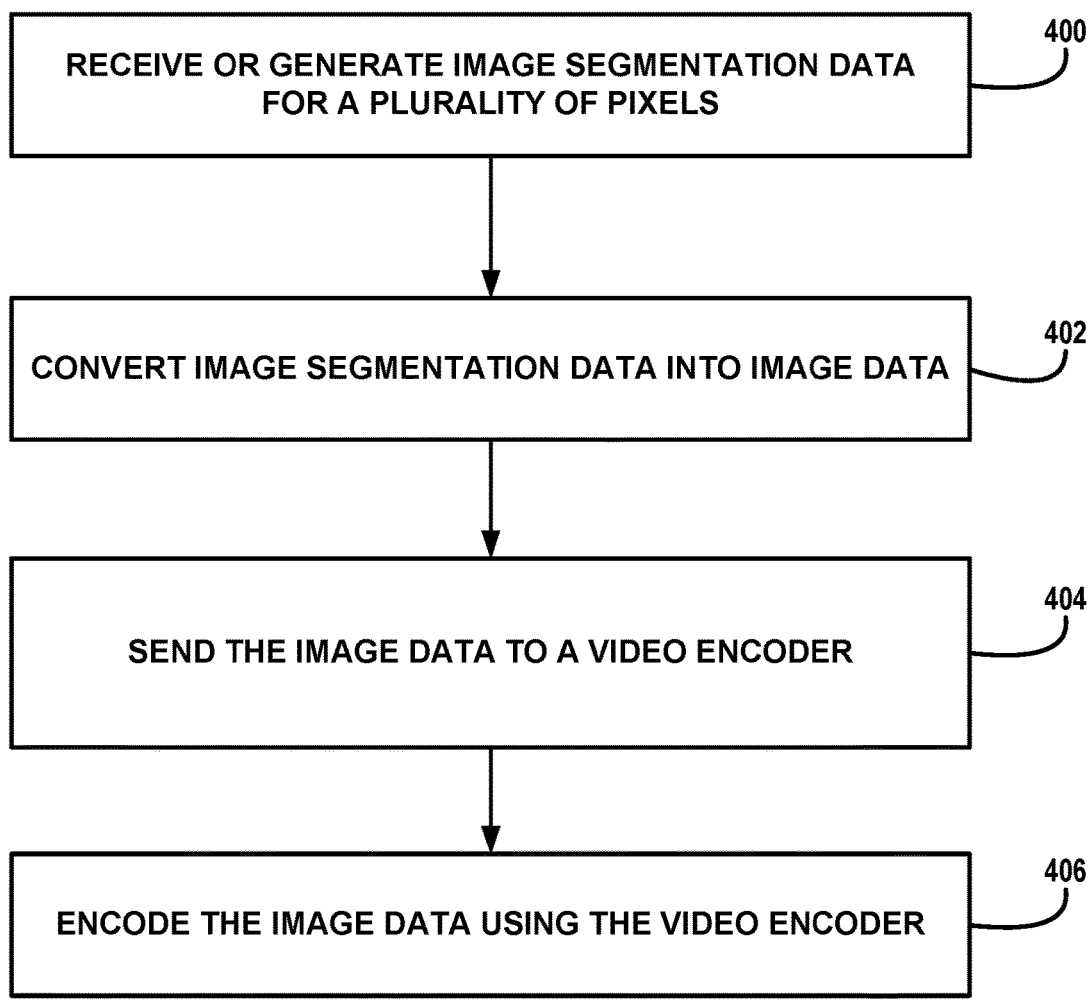
FIG. 4 is a flowchart showing an example method of the disclosure.

FIG. 4 is a flowchart showing an example method of the disclosure. The method of FIG. 4 may be carried out by one or more components of computing device 2. FIG. 4 depicts one example method consistent with one or more techniques of this disclosure.

In the example of FIG. 4, processing unit 1 may be configured to receive or generate image segmentation data for a plurality of pixels (400). The plurality of pixels may correspond to an image (e.g., make up part of or all of an image, such as being a subset of pixels corresponding to an image or being all pixels corresponding to an image). In some examples, each pixel of the plurality of pixels may be represented by one or more image component values. The image segmentation data may include one or more image segmentation values for each pixel of the plurality of pixels. The plurality of pixels may include all pixels of the image or less than all pixels of the image. In some examples, processing unit 1 may be configured to receive the image segmentation data for the image from a memory accessible by processing unit 1. The memory accessible by processing unit 1 may or may not be external to processing unit 1. For example, the memory accessible by processing unit 1 may include internal memory 5, system memory 10, or a memory not on computing device 2. The memory not on computing device 2 may refer to a memory on, for example, a server, wherein the memory is external to the processing unit or is not external to the processing unit.

In some examples, the image segmentation data may include Gaussian Mixture Model (GMM) data. In such examples, the one or more image segmentation values may include one or more GMM parameter values for one or more GMM models for each pixel of the plurality of pixels. The one or more GMM parameter values may include at least one of a mean value, a variance value, or a weight value for each pixel of the plurality of pixels. In some examples, it is understood that, as used herein, reference to image segmentation data may refer to one or more image segmentation values corresponding to one or more pixels of an image (e.g., each pixel of an image).

Processing unit 1 may be configured to convert image segmentation data into image data (402). For example, processing unit 1 may be configured to convert the image segmentation data into one or more image component values. The one or more image component values corresponding to the image segmentation data may constitute image data. As another example, processing unit 1 may be configured to convert one or more image segmentation values into one or more image component values. The one or more image component values corresponding to the one or more image segmentation values may constitute image data.

Processing unit 1 may be configured to send the image data to a video encoder (404). For example, processing unit 1 may be configured to send the one or more image component values corresponding to the one or more image segmentation values to a video encoder (e.g., video coder 7). In some examples, the video encoder may be a component of processing unit 1. In other examples, the video encoder may not be a component of processing unit 1.

The video encoder (e.g., video coder 7) may be configured to encode the image data (406). In some examples, the video encoder (e.g., video coder 7) may be configured to encode the image data according to a video coding standard or a video coding specification. In such examples, the video coding standard may include at least one of H.263, H.264, H.265, or a video coding standard different from H.263, H.264, and H.265.

Processing unit 1 and/or the video encoder (e.g., video coder 7) may be configured to store the encoded image data in a memory accessible by processing unit 1. In some examples, storing encoded image data in a memory may refer to storing one or more encoded image component values. In some examples, reference to storing one or more encoded image component values in a memory may refer to storing an encoded image in the memory where the image from which the encoded image was derived includes the unencoded image component values, and where the encoded image is represented by one or more encoded image component values. Similarly, reference to receiving one or more encoded image component values may refer to receiving an encoded image. Likewise, reference to decoding one or more encoded image component values may refer to decoding an encoded image. It is understood that these understandings also apply to other descriptions set forth herein. Referring to the memory accessible by processing unit 1, the memory may or may not be external to processing unit 1. For example, the memory accessible by processing unit 1 may include internal memory 5, system memory 10, or a memory not on computing device 2. The memory not on computing device 2 may refer to a memory on, for example, a server, wherein the memory is external to the processing unit or is not external to the processing unit.

It should be understood that all of the techniques described herein may be used individually or in combination. For example, processing unit 1, one or more components thereof, and/or one or more components of computing device 2 may perform the techniques described in this disclosure in any combination.

While particular combinations of various aspects of the techniques are described above, these combinations are provided merely to illustrate examples of the techniques described in this disclosure. Accordingly, the techniques of this disclosure should not be limited to these example combinations and may encompass any conceivable combination of the various aspects of the techniques described in this disclosure.

In accordance with this disclosure, the term "or" may be interrupted as "and/or" where context does not dictate otherwise. Additionally, while phrases such as "one or more" or "at least one" or the like may have been used for some features disclosed herein but not others; the features for which such language was not used may be interpreted to have such a meaning implied where context does not dictate otherwise.

In one or more examples, the functions described herein may be implemented in hardware, software, firmware, or any combination thereof. For example, although the term "processing unit" has been used throughout this disclosure, it is understood that such processing units may be implemented in hardware, software, firmware, or any combination thereof. If any function, processing unit, technique described herein, or other module is implemented in software, the function, processing unit, technique described herein, or other module may be stored on or transmitted over as one or more instructions or code on a computer-readable medium. Computer-readable media may include computer data storage media or communication media including any medium that facilitates transfer of a computer program from one place to another. In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. By way of example, and not limitation, such computer-readable media can comprise RAM, ROM, EEPROM, CD-ROM or other optical disk storage, magnetic disk storage or other magnetic storage devices. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media. A computer program product may include a computer-readable medium.

The code may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for image and/or video processing. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules or units are described in this disclosure to emphasize functional aspects of devices configured to perform the disclosed techniques, but do not necessarily require realization by different hardware units. Rather, as described above, various units may be combined in any hardware unit or provided by a collection of inter-operative hardware units, including one or more processors as described above, in conjunction with suitable software and/or firmware.

Various examples have been described. These and other examples are within the scope of the following claims.

What is claimed is:

1. A method comprising:
   receiving or generating, by a processing unit implemented in circuitry, image segmentation data for a plurality of pixels, wherein the image segmentation data includes a plurality of Gaussian Mixture Model (GMM) parameter values for one or more GMM models for each pixel of the plurality of pixels, and wherein the plurality of GMM parameter values includes a mean value, a variance value, and a weight value for each pixel of the plurality of pixels;
   converting, by the processing unit, the plurality of GMM parameter values into a plurality of image component values, wherein converting the plurality of GMM parameter values comprises converting the mean value of the plurality of GMM parameter values into a first image component value of the plurality of image component values using one or more look up tables (LUTs), converting the variance value of the plurality of GMM parameter values into a second image component value of the plurality of image component values using the one or more LUTs, and converting the weight value of the plurality of GMM parameter values into a third image component value of the plurality of image component values using the one or more LUTs; and
   encoding, by a video encoder, the plurality of image component values.

2. The method of claim 1, further comprising:
   encoding, by the video encoder, the plurality of image component values according to a video coding standard or a video coding specification.

3. The method of claim 2, wherein the video coding standard includes at least one of H.263, H.264, H.265, or a video coding standard different from H.263, H.264, and H.265.

4. The method of claim 1, further comprising:
   receiving the image segmentation data from a memory accessible by the processing unit, wherein the memory is external to the processing unit or is not external to the processing unit.

5. The method of claim 1, further comprising:
   storing the encoded plurality of image component values in a memory accessible by the processing unit.

6. The method of claim 5, wherein the memory is external to the processing unit.

7. The method of claim 1, wherein the plurality of image component values correspond to one or more images, and wherein the plurality of pixels corresponds to an image that is different from the one or more images.

8. The method of claim 7, further comprising:
   encoding, by the video encoder, the plurality of image component values by encoding the one or more images, wherein the video encoder is a component of the processing unit or the video encoder is not a component of the processing unit.

9. The method of claim 1, wherein each pixel of the plurality of pixels is represented by one or more image component values, wherein the one or more image component values corresponding to each pixel include at least one of a red color component value, a blue color component value, a green color component value, a luma component value, or a chroma component value, and wherein the plurality of image component values corresponding to the plurality of GMM parameter values include at least one of a red color component value, a blue color component value, a green color component value, a luma component value, or a chroma component value.

10. The method of claim 1, wherein the plurality of pixels includes all pixels of an image or less than all pixels of the image.

11. A device comprising:
    a first memory;
    a processing unit implemented in circuitry, the processing unit being configured to:
    receive or generate image segmentation data for a plurality of pixels, wherein the image segmentation data includes a plurality of Gaussian Mixture Model (GMM) parameter values for one or more GMM models for each pixel of the plurality of pixels, and wherein the plurality of GMM parameter values includes a mean value, a variance value, and a weight value for each pixel of the plurality of pixels;

convert the plurality of GMM parameter values into a plurality of image component values, wherein, to convert the plurality of GMM parameter values, the processing unit is configured to convert the mean value of the plurality of GMM parameter values into a first image component value of the plurality of image component values using one or more look up tables (LUTs), convert the variance value of the plurality of GMM parameter values into a second image component value of the plurality of image component values using the one or more LUTs, and convert the weight value of the plurality of GMM parameter values into a third image component value of the plurality of image component values using the one or more LUTs; and store the plurality of image component values corresponding to the plurality of GMM parameter values in the first memory; and a video encoder configured to encode the plurality of image component values.

12. The device of claim 11, further comprising a second memory, wherein the processing unit is configured to receive the image segmentation data for the plurality of pixels from the first memory or the second memory, wherein the first memory is external to the processing unit or is not external to the processing unit.

13. The device of claim 12, further comprising a second memory, wherein at least one of the video encoder or the processing unit is configured to store the encoded plurality of image component values in the first memory or the second memory.

14. The device of claim 11, wherein the plurality of image component values correspond to one or more images, and wherein the plurality of pixels corresponds to an image that is different from the one or more images.

15. The device of claim 14, wherein the video encoder is configured to encode the plurality of image component values by being configured to encode the one or more images, wherein the video encoder is a component of the processing unit or the video encoder is not a component of the processing unit.

16. The device of claim 11, wherein each pixel of the plurality of pixels is represented by one or more image component values, wherein the one or more image component values corresponding to each pixel include at least one of a red color component value, a blue color component value, a green color component value, a luma component value, or a chroma component value, and wherein the plurality of image component values corresponding to the plurality of GMM parameter values include at least one of a red color component value, a blue color component value, a green color component value, a luma component value, or a chroma component value.

17. The device of claim 11, wherein the plurality of pixels includes all pixels of an image or less than all pixels of the image.

18. An apparatus comprising:

means for receiving or generating image segmentation data for a plurality of pixels, wherein the image segmentation data includes a plurality of Gaussian Mixture Model (GMM) parameter values for one or more GMM models for each pixel of the plurality of pixels, and wherein the plurality of GMM parameter values includes a mean value, a variance value, and a weight value for each pixel of the plurality of pixels;

means for converting the plurality of GMM parameter values into a plurality of image component values, wherein the means for converting the plurality of GMM parameter values comprises means for converting the mean value of the plurality of GMM parameter values into a first image component value of the plurality of image component values using one or more look up tables (LUTs), means for converting the variance value of the plurality of GMM parameter values into a second image component value of the plurality of image component values using the one or more LUTs, and means for converting the weight value of the plurality of GMM parameter values into a third image component value of the plurality of image component values using the one or more LUTs; and means for encoding the plurality of image component values.

19. The apparatus of claim 18, further comprising:

means for storing the encoded plurality of image component values corresponding to the plurality of GMM parameter values.

20. The apparatus of claim 18, wherein the plurality of image component values correspond to one or more images, and wherein the plurality of pixels corresponds to an image that is different from the one or more images.

21. The apparatus of claim 20, wherein the means for encoding the plurality of image component values includes means for encoding the one or more images.

22. The apparatus of claim 18, wherein each pixel of the plurality of pixels is represented by one or more image component values, wherein the one or more image component values corresponding to each pixel include at least one of a red color component value, a blue color component value, a green color component value, a luma component value, or a chroma component value, and wherein the plurality of image component values corresponding to the plurality of GMM parameter values include at least one of a red color component value, a blue color component value, a green color component value, a luma component value, or a chroma component value.

23. The apparatus of claim 18, wherein the plurality of pixels includes all pixels of an image or less than all pixels of the image.

24. A method comprising:

receiving, by a video decoder, a plurality of encoded image component values;

decoding, by the video decoder, the plurality of encoded image component values to generate a plurality of decoded image component values; and converting, by a processing unit implemented in circuitry, the plurality of decoded image component values into a plurality of Gaussian Mixture Model (GMM) parameter values for one or more GMM models for each pixel of the plurality of pixels, wherein converting the plurality of decoded image component values comprises converting a first image component value of the plurality of image comonent values into a mean value of the plurality of GMM parameter values using one or more look up tables (LUTs), converting a second image component value of the plurality of image component values into a variance value of the plurality of GMM parameter values using the one or more LUTs, and converting a third image component value of the plurality of image component values into a weight value of the plurality of GMM parameter values using the one or more LUTs, and wherein the video decoder is a component of the processing unit or the video decoder is not a component of the processing unit.

* * * * *